United States Patent
Heitzenrater et al.

(10) Patent No.: US 9,528,557 B1
(45) Date of Patent: Dec. 27, 2016

(54) MULTI-GRADE ALUMINUM LASER WELDED CLUTCH COMPONENTS

(71) Applicant: GM Global Technology Operations LLC, Detroit, MI (US)

(72) Inventors: Scott William Heitzenrater, Orion, MI (US); Huaxin Li, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/837,075

(22) Filed: Aug. 27, 2015

(51) Int. Cl.
   *F16D 13/68* (2006.01)
   *F16D 13/60* (2006.01)
   *F16D 13/74* (2006.01)

(52) U.S. Cl.
   CPC ............... *F16D 13/60* (2013.01); *F16D 13/74* (2013.01)

(58) Field of Classification Search
   CPC .......... F16D 13/60; F16D 13/74; F16D 13/52; F16D 13/646
   See application file for complete search history.

(56) References Cited

U.S. PATENT DOCUMENTS

| | | | | |
|---|---|---|---|---|
| 3,279,835 A * | 10/1966 | Krohm | ................. | F16B 7/0413 285/321 |
| 4,014,619 A * | 3/1977 | Good | ...................... | F16D 13/52 192/70.2 |
| 4,301,904 A * | 11/1981 | Ahlen | ................... | F16D 13/683 192/70.12 |
| 5,180,043 A * | 1/1993 | Walker | ................. | F16D 13/683 192/70.19 |
| 2004/0035667 A1* | 2/2004 | Prater | .................... | F16D 13/62 192/70.2 |
| 2005/0207835 A1* | 9/2005 | Schoch | ................... | F16B 21/18 403/321 |
| 2006/0065506 A1* | 3/2006 | Doherty | ............... | F16D 13/683 192/70.2 |
| 2009/0194384 A1* | 8/2009 | Tsukuda | ............... | F16D 13/683 192/107 C |
| 2010/0044179 A1* | 2/2010 | Nakamura | ............. | F16D 13/52 192/58.2 |
| 2011/0297503 A1* | 12/2011 | Szuba | ................... | F16D 13/683 192/108 |
| 2011/0315505 A1* | 12/2011 | Keating | ............... | F16D 13/683 192/112 |
| 2015/0176659 A1* | 6/2015 | Bowman | ............ | F16D 25/0638 192/112 |

* cited by examiner

*Primary Examiner* — David J Hlavka

(57) ABSTRACT

A clutch housing for an automatic transmission includes an aluminum hub and a drum portion which is laser or friction welded to the hub. Due to the different strength requirements of the hub and drum, the hub is fabricated of 6082-T6 aluminum or a material of similar strength and malleability and is forged or die cast. The hub includes male splines or gear teeth disposed on its periphery. The cylindrical drum is fabricated of 7075-T6 aluminum or a material of similar or greater strength and similar malleability and is roller died or stamped and includes female splines or gear teeth on its inner surface as well as a plurality of radially oriented lubrication openings or slots which facilitate flow of lubricating fluid from the interior to the exterior of the cylindrical drum.

19 Claims, 3 Drawing Sheets

MULTI-GRADE ALUMINUM LASER WELDED CLUTCH COMPONENTS

FIELD

The present disclosure relates to aluminum transmission clutch components and more particularly to multi-grade aluminum laser welded transmission clutch components.

BACKGROUND

The statements in this section merely provide background information related to the present disclosure and may or may not constitute prior art.

Many contemporary multi-speed motor vehicle transmissions include a plurality of planetary gear assemblies which have a plurality of fixed connections between the elements of the planetary gear assemblies and a plurality of clutches and brakes also connected to the elements of the planetary gear assemblies that can be selectively and sequentially activated to provide the available gear ratios in an appropriate sequence.

A common component of such transmissions is a cylindrical clutch housing having a hub with male splines or gear teeth at one end and a cylindrical drum section with female splines or gear teeth on an inner surface and a plurality of oil exhaust holes or apertures. Such clutch housings are typically die cast of 380 or 390 aluminum. While this process generates a wholly serviceably component, there are some aspects that can be improved. The die casting process can result in variations and porosity that can lead to cracks, especially in the drum section. If aluminum 390 is utilized to fabricate the housing, the part is stronger than if it were cast of 380 aluminum but because of the hardness of 390 aluminum, the tooling utilized to machine the housing has a shorter service life. As is typical of a complex part, certain areas of the part have higher operational stress than others. If, as is typical, the part is fabricated of one material, such as 380 aluminum, the only way to increase strength in a high stress area is to increase its thickness. This approach will add to the weight and inertia of the part. Alternatively, of course, the entire part could be fabricated of a higher strength material. Another difficulty of a die cast clutch housing is the requirement to drill radially oriented oil exhaust holes in the drum section as they cannot be formed during the die casting process.

From the foregoing, it is apparent that improvements in the configuration and process of fabrication of clutch housings for vehicle transmissions would be desirable. The present invention is so directed.

SUMMARY

The present invention provides a clutch housing for an automatic transmission having a forged or die cast aluminum hub and a roller died or stamped drum section which is laser or friction welded to the hub. Due to the different strength requirements of the hub and drum, the hub is fabricated of 6082-T6 aluminum or a material of similar strength and malleability and is forged or die cast. The hub includes male splines or gear teeth disposed on its periphery and an inner collar with fluid passageways. The cylindrical drum is fabricated of 7075-T6 aluminum or a material of similar or greater strength and similar malleability and is roller died, stamped or grobed and includes female splines or gear teeth on its inner surface as well as a plurality of radially oriented lubrication openings or slots which facilitate radial flow of lubricating and cooling fluid from the interior to the exterior of the cylindrical drum.

Thus it is an aspect of the present invention to provide an aluminum clutch housing for an automatic transmission.

It is a further aspect of the present invention to provide a two piece aluminum clutch housing having components which are welded together.

It is a still further aspect of the present invention to provide a two piece aluminum clutch housing for an automatic transmission having components which are welded together.

It is a still further aspect of the present invention to provide a two piece aluminum clutch housing having components which are laser or friction welded together.

It is a still further aspect of the present invention to provide a two piece aluminum clutch housing for an automatic transmission having components which are laser or friction welded together.

It is a still further aspect of the present invention to provide a two piece aluminum clutch housing for an automatic transmission having a clutch hub and a clutch drum which are welded together.

It is a still further aspect of the present invention to provide a two piece aluminum clutch housing for an automatic transmission having a clutch hub and a clutch drum which are laser or friction welded together.

It is a still further aspect of the present invention to provide a two piece aluminum clutch housing for an automatic transmission having a forged or die cast clutch hub and a roller died, stamped or grobed clutch drum which are welded together.

It is a still further aspect of the present invention to provide a two piece aluminum clutch housing for an automatic transmission having a forged or die cast clutch hub and a roller died, stamped or grobed clutch drum which are laser or friction welded together.

It is a still further aspect of the present invention to provide a two piece aluminum clutch housing for an automatic transmission having a clutch hub of 6082-T6 aluminum and a clutch drum of 7075-T6 aluminum which are welded together.

It is a still further aspect of the present invention to provide a two piece aluminum clutch housing for an automatic transmission having a clutch hub of 6082-T6 aluminum and a clutch drum of 7075-T6 aluminum which are laser or friction welded together.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
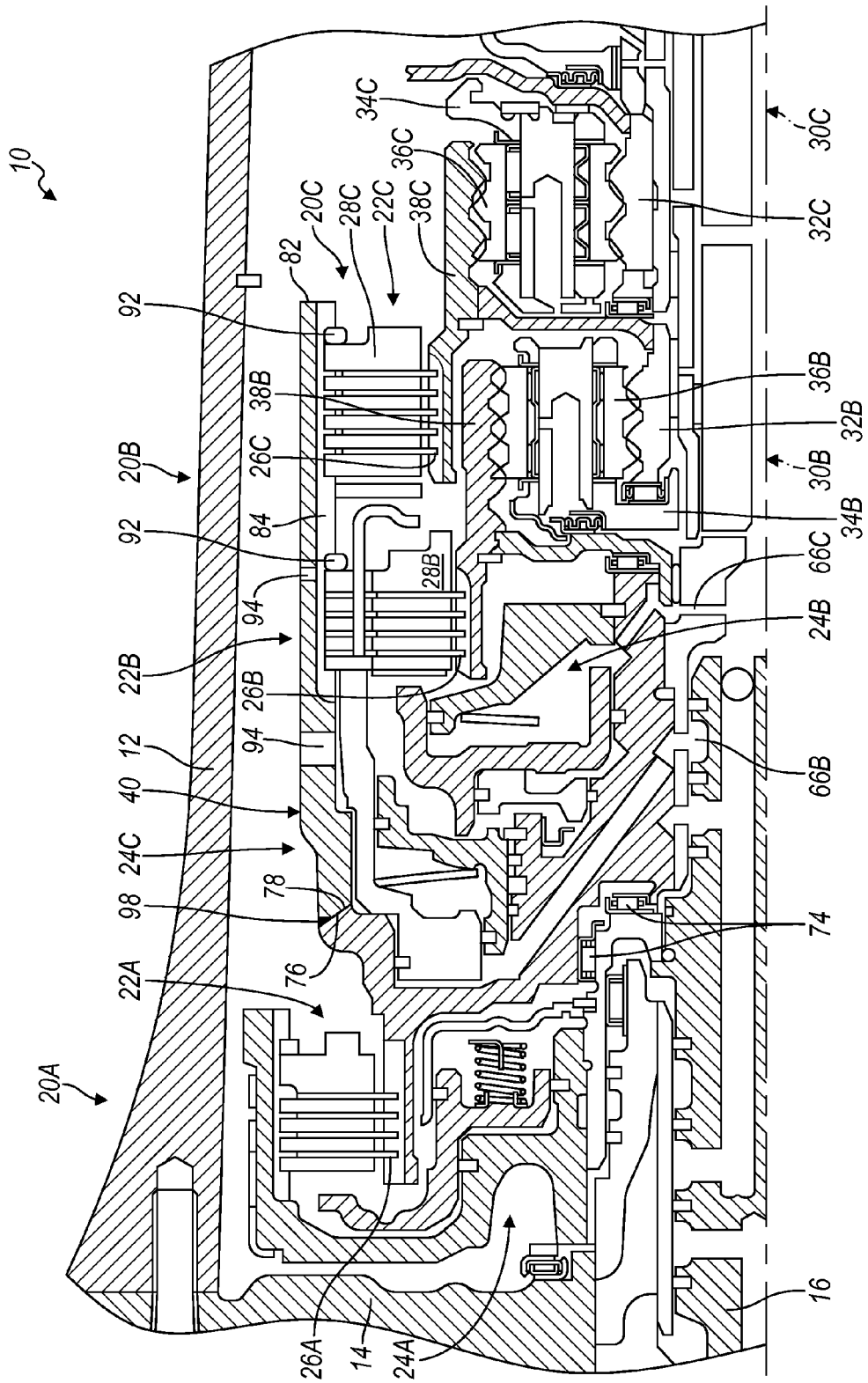
FIG. 1 is a half sectional view of a portion of a motor vehicle automatic transmission having a clutch housing assembly according to the present invention.

With reference to FIG. 1, a portion of an automatic transmission is illustrated and generally designated by the reference number 10. The automatic transmission 10 includes a cast metal housing 12 and a bulkhead 14. Together the housing and the bulkhead 14 locate, support and protect various components of the transmission 10 such as an input shaft 16, a plurality of friction clutch assemblies 20A, 20B and 20C having respective friction clutch packs 22A, 22B and 22C and respective hydraulic operators 24A, 24B and 24C. Associated with the two friction clutch assemblies 20B and 20C are respective planetary gear assemblies 30B and 30C. The planetary gear assemblies 30B and 30C are conventional and include sun gears 32B and 32C, planet gear carriers 34B and 34C, planet gears 36B and 36C and ring gears 38B and 38C. In the automatic transmission 10 illustrated, the sun gear 32B is coupled to the ring gear 38C which is coupled to friction plates 26C in the friction clutch pack 22C and the ring gear 38B is coupled to friction plates 26B in the friction clutch pack 22B. It should be appreciated that such interconnections are exemplary only and that other and distinct connections may and will be made in other transmission configurations embodying the present invention.

Figure 2:
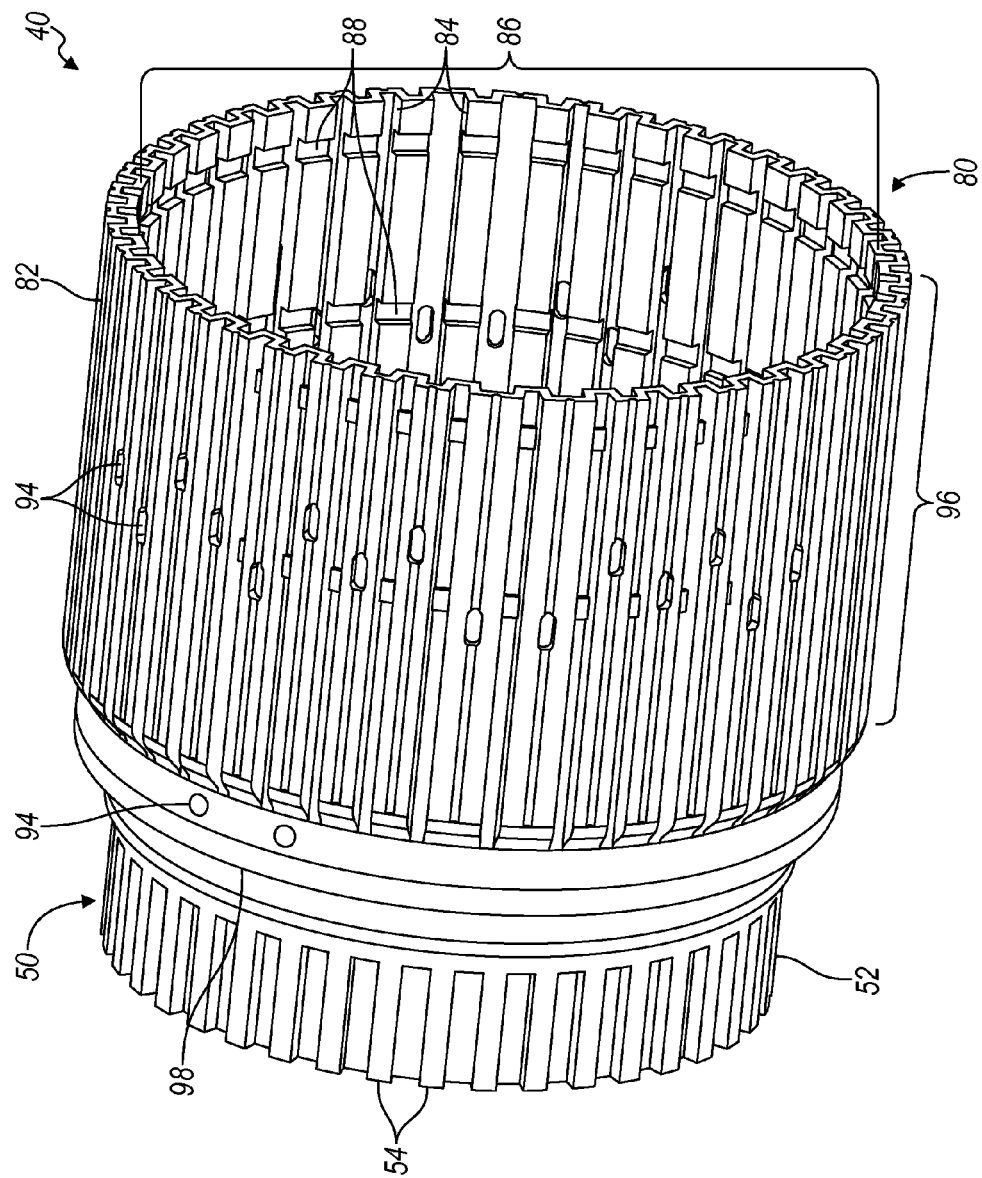
FIG. 2 is a perspective view of a clutch housing assembly according to the present invention.
Figure 3:
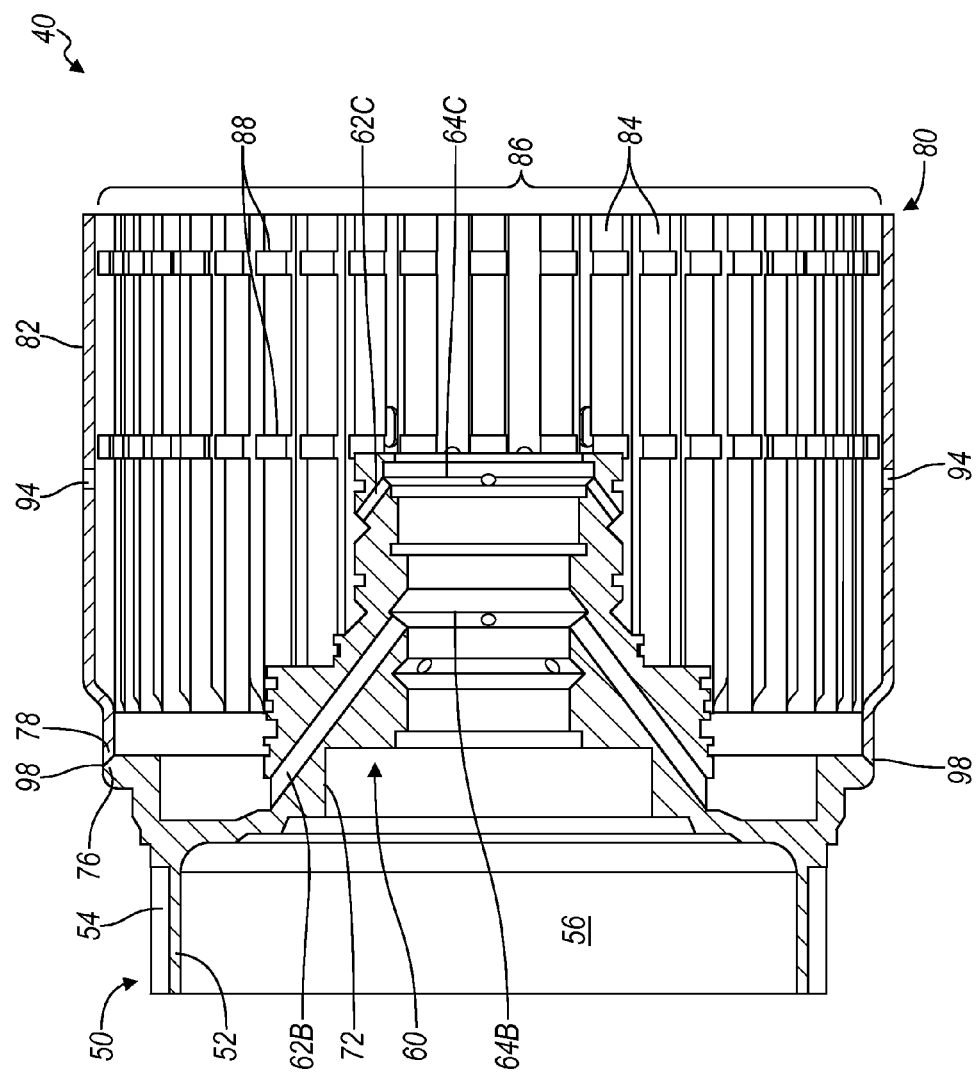
FIG. 3 is a full sectional view of a clutch housing assembly according to the present invention.

Referring now to FIGS. 1, 2 and 3, interconnecting these several components is a transmission clutch housing assembly 40. The transmission clutch housing assembly 40 generally includes a smaller diameter hub 50, a stepped inner collar 60 which is integrally formed with the smaller diameter hub 50 and a larger diameter cylindrical drum 80 which is secured to the hub 50 and the inner collar 60. As best illustrated in FIG. 2, the smaller diameter hub 50 of the transmission clutch housing assembly 40 includes a cylindrical region 52 having male splines or gear teeth 54 about its periphery which may engage, for example, friction plates 26A in the friction clutch pack 22A of the friction clutch assembly 20A. An inner region 56 is configured to receive the hydraulic operator 24A of the friction clutch assembly 20A. The stepped inner collar 60 includes oblique hydraulic fluid passageways 62B and 62C which communicate with circular channels or grooves 64B and 64C and provide hydraulic fluid to the hydraulic operators 24B and 24C. These oblique passageways 62B and 62C communicate with independent, i.e., isolated, axial passageways 66B and 66C in and adjacent the input shaft 16. The stepped inner collar 60 may also include one or more shoulders or re-entrant regions 72 which cooperate with bearings 74 or other features in the transmission 10. Finally, the hub 50 includes an outer oblique circular surface 76 which aligns with a complementarily configured oblique surface 78 on the cylindrical drum 80. The hub 50 and the stepped inner collar 60 are preferably fabricated of 6082-T6 aluminum or a material of similar strength and malleability. It should be understood, however, that the hub 50 and the stepped collar 60 may be fabricated of 380 or 390 grade aluminum although all the benefits of the present invention will not be realized by doing so. The hub 50 and the stepped inner collar 60 are preferably forged or die cast.

The drum portion 80 of the clutch housing assembly 40 includes a cylindrical body 82 having axially extending female splines or gear teeth 84 disposed on and forming its inner cylindrical surface 86. One or more inner circular channels or grooves 88 are formed in the splines or gear teeth 84 and receive snap rings 92 which axially retain reaction plates 28B and 28C and other components of the friction clutch packs 22B and 22C. The reaction plates 28B and 28C engage the female splines or gear teeth 84 of the drum 80 and thus rotate therewith. The drum 80 also includes a plurality of generally radially oriented lubrication openings, apertures or slots 94 which provide a path for lubricating fluid from the interior to the exterior of the drum 80. The cylindrical drum 80 is preferably fabricated of 7075-T6 aluminum or a material of similar or higher strength and similar malleability. The drum 80 is preferably roller died, stamped or grobed, i.e., produced by the Grob process. The Grob process is a cold forming, i.e., rolling, process for generating splines, teeth and similar structures in sheet metal without the generation of chips. It was developed by Ernst Grob, AG of Mannedorf, Switzerland. It should be appreciated that the exterior channeled or striated surface 96 and the crenelated cylindrical body 82 of the drum portion 80 is the result of the Grob and other fabrication processes. While this configuration is preferable to a cylinder with axial splines 84 formed or machined on the inner cylindrical surface 86 as it reduces the weight of the drum portion 80, the exterior surface 96 may be smooth or define other configurations.

Referring to FIG. 3, the hub 50, including the stepped inner collar 60, is assembled to the cylindrical drum 80 by aligning the oblique circular surface 76 on the hub 50 with the oblique circular surface 78 on the cylindrical drum 80 and welding the two components together by laser, friction, electric discharge, electron beam or MIG (metal-inert gas) welding which creates a circular weld 98 between the oblique circular surfaces 76 and 78 and secures the hub 50 to the cylindrical drum 80 thereby completing the manufacture of the clutch housing assembly 40.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch housing assembly comprising, in combination,
a clutch hub having a first diameter, a periphery including a plurality of male splines, a first outer circular surface, a collar having a second diameter smaller than said first diameter and including at least one oblique lubrication passage,
a cylindrical drum of a third diameter larger than said first diameter and having an inner surface including a plurality of female splines, at least one circular channel adapted to receive a retaining ring and a second outer circular surface aligned with said first outer circular surface, and
a weld disposed between said first and second outer circular surfaces.

2. The clutch housing assembly of claim 1 further including a plurality of radial lubrication openings in said cylindrical drum.

3. The clutch housing assembly of claim 1 wherein said clutch hub and said cylindrical drum are fabricated of distinct grades of aluminum.

4. The clutch housing assembly of claim 1 wherein said first and said second outer circular surfaces are obliquely oriented.

5. The clutch housing assembly of claim 1 wherein said collar includes at least one circular re-entrant region adapted to receive a bearing assembly.

6. The clutch housing assembly of claim 1 wherein said outer surface of said cylindrical drum includes axial channels.

7. The clutch housing assembly of claim 1 wherein said hub and said collar are fabricated of 6082-T6 aluminum and said cylindrical drum is fabricated of 7075-T6 aluminum.

8. A clutch housing assembly comprising, in combination, a clutch hub having a periphery including a plurality of male splines, a first outer circular surface, an inner collar having at least one oblique lubrication passage, a cylindrical drum having an inner surface including a plurality of female splines, at least one circular channel adapted to receive a retaining ring, a plurality of radial lubrication openings and a second outer circular surface aligned with said first outer circular surface, and a weld disposed between said first and second outer circular surfaces.

9. The clutch housing assembly of claim 8 wherein said clutch hub and said cylindrical drum are fabricated of distinct grades of aluminum.

10. The clutch housing assembly of claim 8 wherein said first and said second outer circular surfaces are obliquely oriented.

11. The clutch housing assembly of claim 8 wherein said collar includes at least one circular re-entrant region adapted to receive a bearing assembly.

12. The clutch housing assembly of claim 8 wherein said outer surface of said cylindrical drum includes axial channels.

13. The clutch housing assembly of claim 8 wherein said hub and said collar are fabricated of 6082-T6 aluminum and said cylindrical drum is fabricated of 7075-T6 aluminum.

14. A clutch housing assembly for an automatic transmission comprising, in combination, a clutch hub having a periphery including a plurality of male splines, a first outer circular surface, an inner collar having at least one oblique lubrication passage, a cylindrical drum having an inner surface including a plurality of female splines, at least one circular channel adapted to receive a retaining ring, a plurality of radial lubrication openings and a second outer circular surface aligned with said first outer circular surface on said clutch hub, and a weld disposed between said first and second outer circular surfaces, wherein said clutch hub and said cylindrical drum are fabricated of two distinct types of aluminum.

15. The clutch housing assembly of claim 14 wherein said first and said second outer circular surfaces are obliquely oriented.

16. The clutch housing assembly of claim 14 wherein said collar includes at least one circular re-entrant region adapted to receive a bearing assembly.

17. The clutch housing assembly of claim 14 wherein said outer surface of said cylindrical drum includes axial channels.

18. The clutch housing assembly of claim 14 wherein said hub and said collar are fabricated of 6082-T6 aluminum and said cylindrical drum is fabricated of 7075-T6 aluminum.

19. The clutch housing assembly of claim 14 wherein said hub and said collar are fabricated of 380 or 390 grade aluminum and said cylindrical drum is fabricated of 7075-T6 aluminum.

* * * * *